G. W. DAMON.
Lap-Seat for Wagons.

No. 199,271. Patented Jan. 15, 1878.

UNITED STATES PATENT OFFICE.

GEORGE W. DAMON, OF BROOKS, MAINE.

IMPROVEMENT IN LAP-SEATS FOR WAGONS.

Specification forming part of Letters Patent No. 199,271, dated January 15, 1878; application filed December 8, 1877.

*To all whom it may concern:*

Be it known that I, GEORGE W. DAMON, of Brooks, in the county of Waldo and State of Maine, have invented a new and valuable Improvement in Lap-Seats for Wagons; and I do hereby declare that the following is a full, clear, and exact description of the construction and operation of the same, reference being had to the annexed drawings, making a part of this specification, and to the letters and figures of reference marked thereon.

Figure 1:
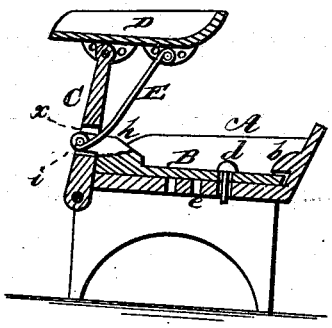
Figure 2:
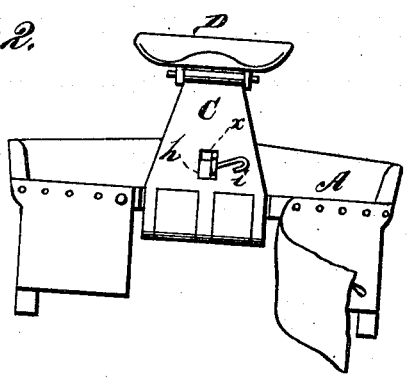
Figure 3:
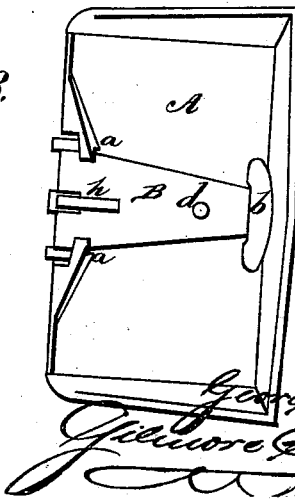

Figure 1 of the drawings is a representation of a longitudinal vertical section of my lap-seat for wagons. Fig. 2 is a front view, and Fig. 3 is a plan view of my lap-seat for wagons with the seat closed.

This invention relates to lap-seats for vehicles—that is to say, a center seat elevated a suitable distance above, and connected to, the ordinary seat of a vehicle or sleigh, to admit of a third person riding without inconveniencing the other two persons, as will be hereinafter more fully set forth, and pointed out in the claims.

The annexed drawings, to which reference is made, fully illustrate my invention.

A represents the ordinary seat of a vehicle or sleigh. B is a cross-bar, located across the center of the seat A, and passed under guides $a\ a$ at the front edge of the seat, and also under a single guide, $b$, at the back. This cross-bar is adjustable backward and forward, and held at any point by means of a pin, $d$, passing through a single hole in the bar, and through any one of a series of holes, $e$, in the seat. At the front end of the cross-bar B is hinged a standard, C, and at the upper end of said standard is hinged a single seat, D. The seat and standard are held in proper position by means of a brace, E, which is hinged to the under side of the seat, and passes downward and forward through an opening, $x$, in the standard, and a pin, $i$, inserted through the front end of the brace. This pin also passes through a hole in the front end of an arm, $h$, projecting from the cross-bar B through the orifice $x$ in the standard, thereby holding both the standard and the seat firmly in position.

The dimensions of the various parts can be arranged to suit circumstances.

The seat D and standard C, when not desired for use, can be folded under the main seat A without entirely removing it therefrom, so as to have it convenient for use when required. It can be easily removed and replaced again, when desired.

If desired, I may add a side hinge, so that the seat can be tipped up edgewise.

What I claim as new, and desire to secure by Letters Patent, is—

1. The adjustable and removable cross-bar B, hinged standard C, and hinged seat D, arranged in combination with the main seat A, for the purposes set forth.

2. The brace E, arm $h$, and pin $i$, in combination with the seat-standard and cross-bar, for the purposes set forth.

In testimony that I claim the above I have hereunto subscribed my name in the presence of two witnesses.

GEORGE W. DAMON.

Witnesses:
 JOHN H. GORDON,
 H. W. FORBES.